US012773976B1

(12) United States Patent
Yeager et al.

(10) Patent No.: US 12,773,976 B1
(45) Date of Patent: Oct. 27, 2026

(54) ELECTRONIC VENT VALVES AND SYSTEMS AND METHODS RELATING THERETO

(71) Applicant: NORFOLK SOUTHERN CORPORATION, Atlanta, GA (US)

(72) Inventors: Brian Yeager, Atlanta, GA (US); Brent Ballew, Atlanta, GA (US); Jessica Ballew, Atlanta, GA (US); Jaisen Gil, Atlanta, GA (US)

(73) Assignee: Norfolk Southern Corporation, Atlanta, GA (US)

( * ) Notice: Subject to any disclaimer, the term of this patent is extended or adjusted under 35 U.S.C. 154(b) by 377 days.

(21) Appl. No.: 18/537,623

(22) Filed: Dec. 12, 2023

Related U.S. Application Data

(60) Provisional application No. 63/387,034, filed on Dec. 12, 2022.

(51) Int. Cl.

| | |
|---|---|
| ***B60T 11/32*** | (2006.01) |
| ***B60T 8/17*** | (2006.01) |
| ***B60T 13/36*** | (2006.01) |
| ***B60T 13/68*** | (2006.01) |
| ***B60T 15/02*** | (2006.01) |
| ***B60T 17/22*** | (2006.01) |

(52) U.S. Cl.
CPC .......... *B60T 15/027* (2013.01); *B60T 8/1705* (2013.01); *B60T 13/365* (2013.01); *B60T 13/683* (2013.01); *B60T 15/021* (2013.01); *B60T 17/22* (2013.01); *B60T 2270/402* (2013.01)

(58) Field of Classification Search
CPC .... B60T 15/021; B60T 15/027; B60T 8/1705; B60T 13/365; B60T 13/683; B60T 17/22; B60T 2270/402
USPC .. 303/20, 22.6, 22.7, 36, 38, 39, 40, 52, 53, 303/70, 77, 78, 80, 81, 82, 83
See application file for complete search history.

(56) References Cited

U.S. PATENT DOCUMENTS

| | | | | |
|---|---|---|---|---|
| 6,238,010 | B1 * | 5/2001 | Barber | B60T 13/665 188/352 |
| 6,474,748 | B1 * | 11/2002 | Cunkelman | B60T 13/665 303/81 |
| 7,144,090 | B2 * | 12/2006 | Kull | B60T 13/683 303/118.1 |
| 9,327,701 | B2 * | 5/2016 | Sich | B60T 15/021 |
| 11,014,585 | B2 * | 5/2021 | Skweres | B60T 17/043 |
| 11,027,756 | B2 * | 6/2021 | Plechey | B61H 13/20 |
| 2018/0265065 | A1 * | 9/2018 | Bailey | B60T 13/683 |

* cited by examiner

*Primary Examiner* — Christopher P Schwartz
(74) *Attorney, Agent, or Firm* — Bradley Arant Boult Cummings LLP; Daniel E. Sineway, Esq.; Micah B. Hensley, Esq.

(57) ABSTRACT

Systems and methods relating to an electronic vent valve are disclosed. The electronic vent valve can include a plurality of inlets and a plurality of air galleries. Each air gallery can be in fluid communication with a corresponding inlet. The electronic vent valve can include an exit air gallery in fluid communication with each of the plurality of air galleries, and a solenoid valve in fluid communication with the exit air gallery. The solenoid valve can be configured to transition between an open position and a closed position, and upon attachment of the electronic vent valve to a train car, the open position can release air from the air brake system to thereby enable the train car to roll freely with unapplied brakes.

20 Claims, 6 Drawing Sheets

ELECTRONIC VENT VALVES AND SYSTEMS AND METHODS RELATING THERETO

CROSS-REFERENCE TO RELATED APPLICATIONS

This application claims priority to, and the benefit under 35 USC § 119 (e) of, U.S. Provisional Patent Application No. 63/387,034, filed Dec. 12, 2022, and entitled "ELECTRONIC VENT VALVES AND METHODS RELATING THERETO," the disclosure of which is incorporated by reference in its entirety as if the same were fully set forth herein.

TECHNICAL FIELD

The technology disclosed herein relates generally to an air control manifold that can attached to, or otherwise placed in fluid communication with, a testing section of an air brake control valve set on a railroad freight car.

BACKGROUND

Freight car air brake systems rely on pressurized air to provide a simple and reliable way to apply braking force. Locomotives and other entrained air sources supply pressurized air (e.g., from an onboard air compressor) through a train line that pneumatically connects each freight car. Depending on the use case, the pressurized air can be supplied to the air brake system to control or stabilize train slack, control train speed, stop the train, or automatically initiate an emergency brake application, such as when the brake pipe of a given car is separated.

Generally, each freight car includes an air control valve that dictates air reservoir charging and initiates brake applications. Typically, freight car air brake systems include two air reservoirs: a service reservoir and an emergency reservoir. When pressurized air is supplied to the air control valves, the service reservoir and the emergency reservoir are charged. Once the system is charged, if the train line pressure is reduced, the air brakes will begin to apply a force (from air pressure stored in the service reservoir) that is proportional to the amount of air reduction made to the train line pressure.

During a service brake application (i.e., normal braking operations, which may also be referenced as a "braking application" or "braking operation"), air pressure is directed to the brake cylinder causing a piston to extend and apply braking force. The braking force from the brake cylinder is transmitted to the brake shoes (or other braking apparatus, such as disc brakes), which press against the wheels or a connected surface and dissipate kinetic energy through friction. During a service brake application, the emergency air reservoir remains charged and does not supply air to the brake cylinder.

When an emergency brake application is initiated, the air pressure in the train line vents to atmosphere, lowering the pressure within the train line and thereby signaling the control valves (e.g., a triple valve) to supply air pressure from the emergency reservoir to the brake cylinder, thereby increasing the braking force above what would be possible with only air pressure from the service reservoir.

During either a service brake application or an emergency brake application, the air brakes will remain applied until the brake pipe is restored to an air pressure greater than a predetermined threshold, which thereby signals the control valves to vent the brake cylinder and release the brakes. When a brake release is initiated, the air in the brake cylinder is released to atmosphere through a retainer valve. Releasing the brakes can also be accomplished manually by pulling a release rod attached to the service valve, depleting air from the system.

To inspect freight cars and/or to allow for the efficient switching of freight cars into new trains, a manual release rod needs to be pulled for each individual freight car, to thereby vent the system and allow the freight car to roll freely with unapplied brakes. This manual process is time-consuming, as an individual or group of individuals must walk entire trains and individually pull each release rod to ensure the brakes release.

Therefore, there is a long-felt but unresolved need for a system or method that automatically vents the air brake system to reduce time constraints associated with inspections and switching freight cars into new trains.

BRIEF SUMMARY

Briefly described, aspects of the present disclosure generally relate to systems and devices relating to an electronic vent valve and methods thereto. The electronic vent valve can function as an automatically controlled valve for draining air within an air brake system. In various embodiments, the electronic vent valve is attached to a multi-port (e.g., four-port) section of a control valve (or a control valve set). The control valve can include multiple ports, and a given port can be associated with one or more corresponding components of the brake system. The electronic vent valve can connect to a service reservoir port, an emergency reservoir port, a brake cylinder port, and/or a brake pipe port (each considered to be a part of the control valve set) and can connect the components of the air brake system to a solenoid valve through a series of air galleries (e.g., an airflow passage or pathway). The control valve set can be defined as a valve control system used to manage the amount of pneumatic pressure amounts and allocations of a train brake system (e.g., the amount of pneumatic pressure applied when braking the train). Each air gallery can include a corresponding check valve that can permit air to freely flow therethrough when the solenoid is activated (e.g., opened to vent air from the air brake system). The check valves can also prevent any air from back flowing into their respective chambers, and/or the check valves can enable the air brake system to function normally when the solenoid is in the closed position.

The electronic vent valve described herein can include (or be included in) a manifold design, which can enable the electronic vent valve to be easily positioned to fluidly connect to one or more ports of a control valve set and/or enable a control system to operate the solenoid of the electronic vent valves in a variety of ways and as discussed in further detail herein. As a non-limiting example, the electronic vent valve can facilitate depletion of air, via one or more air galleries individually or simultaneously, from the air brake system of one or more freight cars. The electronic vent valve can eliminate the need for the air brake system of each freight car to be manually activated (e.g., via bleed rod) before the freight cars can be switched. The various benefits of the electronic vent valve can include, but are not limited to, increased employee safety, decreased freight car terminal dwell time, decreased freight car switching time, decreased destination travel time, and/or increase railroad efficiency and/or network velocity.

The disclosed technology includes an electronic vent valve. The electronic vent valve can comprise a plurality of inlets, a plurality of air galleries, an exit air gallery, and a solenoid valve. Each of the plurality of air galleries can be in fluid communication with a corresponding inlet of the plurality of inlets. The exit air gallery can be in fluid communication with each of the plurality of air galleries. The solenoid valve can be in fluid communication with the exit air gallery, and the solenoid valve can be configured to transition between an open position and a closed position. Upon attachment of the electronic vent valve to a train car, the open position can release air from an air brake system of the train car to thereby enable the train car to roll freely with unapplied brakes.

The electronic vent valve can be attachable to a control valve set of the train car.

The control valve set can comprise a service reservoir outlet in fluid communication with a service reservoir of the train car, an emergency reservoir outlet in fluid communication with an emergency reservoir of the train car, and a brake cylinder outlet in fluid communication with a brake cylinder of the train car. A first inlet of the plurality of inlets can be configured to fluidly and mechanically connect to the service reservoir outlet; a second inlet of the plurality of inlets can be configured to fluidly and mechanically connect to the emergency reservoir outlet; and a third inlet of the plurality of inlets can be configured to fluidly and mechanically connect to the brake cylinder outlet.

The electronic vent valve can comprise one or more bolt apertures, and each of the one or more bolt apertures can be configured to align with one or more corresponding bolt apertures on the train car such that the electronic vent valve is attachable to the train car via one or more corresponding bolts.

The electronic vent valve can comprise a plurality of check valves. Each check valve of the plurality of check valves can be located in a corresponding air gallery of the plurality of air galleries.

The electronic vent valve can comprise a solenoid connection in fluid communication with the exit air gallery. The solenoid valve can be detachably attachable to the solenoid connection.

The electronic vent valve can comprise a controller having one or more processors and memory, and the controller can be configured to output instructions for the solenoid valve to open or close.

The controller can be in electric communication with a computing device, and the controller can be configured to output the instructions for the solenoid valve to open or close in response to receiving an instruction signal from the computing device.

The electronic vent valve can comprise one or more sensors in electric communication with the controller. The controller can be in electric communication with a computing device, and the controller can be configured to transmit sensor data to the computing device. The sensor data can be indicative of data collected by the one or more sensors.

The one or more sensors can comprise a pressure sensor, a geolocation sensor, or an accelerometer.

The disclosed technology includes a system, and the system can comprise a plurality of train cars. Each of the plurality of train cars can comprise an electronic vent valve, and each of the electronic vent valves can comprise a plurality of inlets, a plurality of air galleries, an exit air gallery, and a solenoid valve. Each of the plurality of air galleries can be in fluid communication with a corresponding inlet of the plurality of inlets. The exit air gallery can be in fluid communication with each of the plurality of air galleries. The solenoid valve can be in fluid communication with the exit air gallery, and the solenoid valve can be configured to transition between an open position and a closed position. Upon attachment of the electronic vent valve to a corresponding train car of the plurality of train cars, the open position can release air from an air brake system of the corresponding train car to thereby enable the corresponding train car to roll freely with unapplied brakes.

Each electronic vent valve can be attached to a control valve set of a corresponding train car of the plurality of train cars. Each control valve set can comprise: a service reservoir outlet in fluid communication with a service reservoir of the corresponding train car of the plurality of train cars; an emergency reservoir outlet in fluid communication with an emergency reservoir of the corresponding train car of the plurality of train cars; and a brake cylinder outlet in fluid communication with a brake cylinder of the corresponding train car of the plurality of train cars. For each electronic vent valve: a first inlet of the plurality of inlets can be configured to fluidly and mechanically connect to the service reservoir outlet of a corresponding control valve set; a second inlet of the plurality of inlets can be configured to fluidly and mechanically connect to the emergency reservoir outlet of the corresponding control valve set; and a third inlet of the plurality of inlets can be configured to fluidly and mechanically connect to the brake cylinder outlet of the corresponding control valve set.

Each electronic vent valve can comprise a plurality of check valves. Each check valve of the plurality of check valves can be located in a corresponding air gallery of the plurality of air galleries.

Each electronic vent valve can comprise a solenoid connection in fluid communication with the exit air gallery. The solenoid valve can be detachably attachable to the solenoid connection.

Each electronic vent valve can comprise a controller having one or more processors and memory, and the controller can be configured to output instructions for the corresponding solenoid valve to open or close.

The controller of each electronic vent valve can be in electric communication with a common computing device, and the controller of each electronic vent valve can be configured to output the instructions for the corresponding solenoid valve to open or close in response to receiving an instruction signal from the computing device.

Each electronic vent valve can comprise one or more sensors in electric communication with the controller. The controller of each electronic vent valve can be in electric communication with a common computing device, and the controller of each electronic vent valve can be configured to transmit sensor data to the computing device. The sensor data can be indicative of data collected by the corresponding one or more sensors.

For each electronic vent valve, the one or more sensors can comprise a pressure sensor, a geolocation sensor, or an accelerometer.

The system can comprise the computing device, and the computing device can be configured to: determine the plurality of train cars are connected together to form a train by at least: receiving, from each electronic vent valve, geolocation data indicating a location of the corresponding train car of the plurality of train cars; and determining, for each electronic vent valve, that the location of the corresponding train car is within a predetermined range of a location of another train car of the plurality of train cars; and transmit a mass instruction signal for each of the electronic vent valves to transition the corresponding solenoid valve to the open position.

The system can comprise the computing device, and the computing device being configured to: determine the plurality of train cars are connected together to form a train by at least: receiving, from each electronic vent valve, accelerometer data indicating a speed of the corresponding train car of the plurality of train cars; and determining, for each electronic vent valve, that the speed of the corresponding train car is within a predetermined range of a speed of another train car of the plurality of train cars; and transmit a mass instruction signal for each of the electronic vent valves to transition the corresponding solenoid valve to the open position.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more examples, embodiments, and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
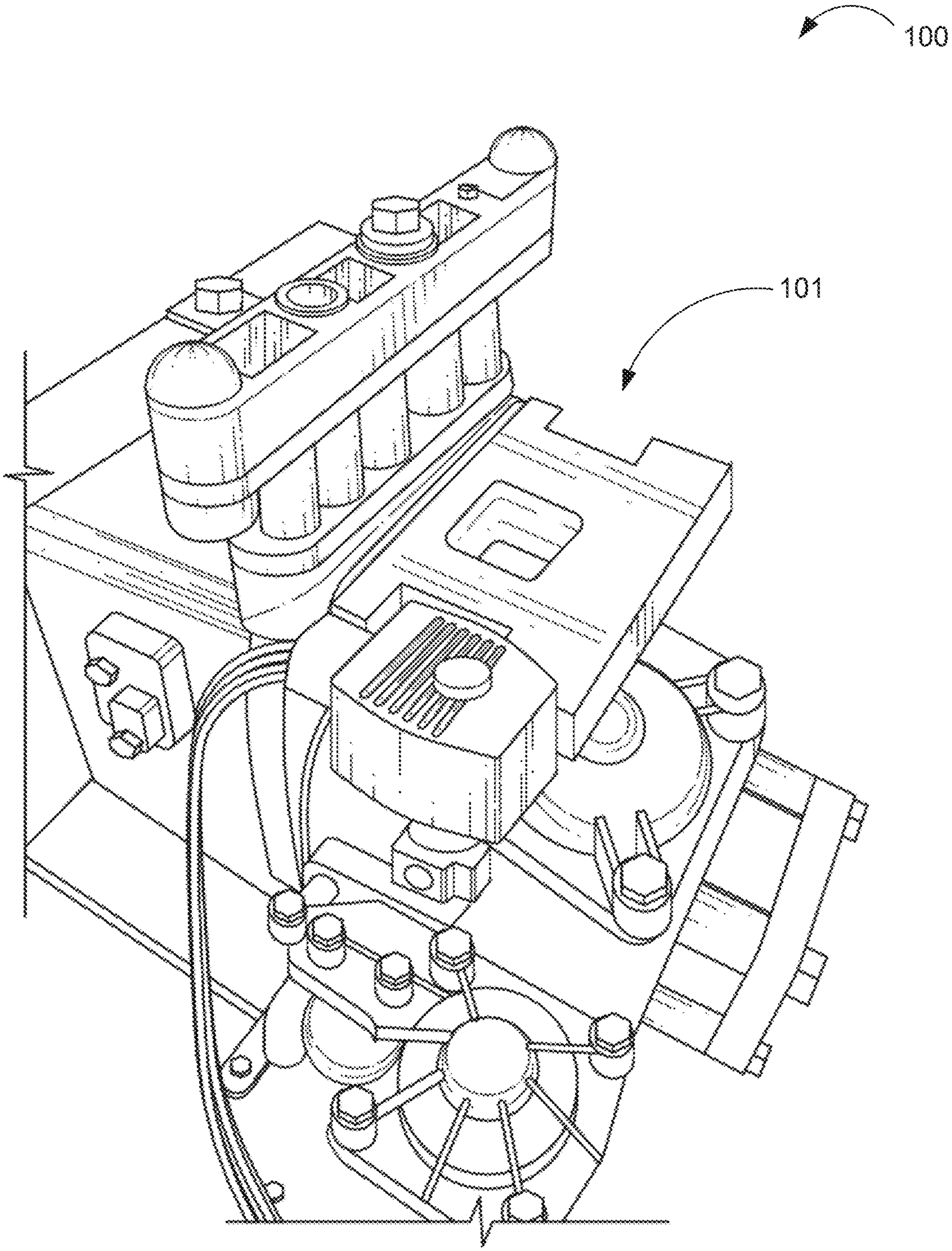
FIG. 1 illustrates a perspective view of an example electronic vent valve in an installed configuration, in accordance with the present disclosure.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

Also, in describing the examples, terminology will be resorted to for the sake of clarity. It is intended that each term contemplates its broadest meaning as understood by those skilled in the art and includes all technical equivalents, which can operate in a similar manner to accomplish a similar purpose.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure generally relate to systems, apparatuses, and methods relating to an electronic vent valve. The electronic vent valve can function as an automatically controlled valve for venting or draining air from an air brake system, such as an air brake system on a freight car and/or train car. The electronic vent valve can be attached to one or more ports of a control valve set on a train car (e.g., a four-port section of the control valve set). For example, the electronic vent valve can fluidly connect a service reservoir, an emergency reservoir, a brake cylinder, and/or a brake pipe of the control valve set to a solenoid valve through a series of air galleries (e.g., airflow passages or pathways). As described more fully herein, the electronic vent valve can include a manifold that can fluidly connect to multiple ports of the control valve set. The control valve set can be defined as a valve control system configured and/or used to manage the amount of pneumatic pressure applied to a train car when braking. Each air gallery of the electronic vent valve can include (or be in fluid communication with) a corresponding check valve that can allow for the free flow of air when the solenoid valve is open. The solenoid valve can activate (e.g., open) to vent air from the air brake system. The check valves can also prevent air from backflowing into a corresponding chamber (e.g., the service reservoir, emergency reservoir, brake cylinder, or brake pipe). That is to say, the check valves can permit air to flow in a first direction from the train car and toward the solenoid valve, while preventing the air from flowing in a second direction (opposite from the first direction) from the solenoid valve toward the train car. As such, the check valves can allow the air brake system to function normally when the solenoid valve is in the closed position.

The manifold design of the electronic vent valve can allow a control system (e.g., a computing system and/or controller) to operate the solenoid valve in a variety of ways and as discussed in further detail herein. For example, the electronic vent valve can facilitate depletion or release of stored air, individually or simultaneously, for the freight car air brake systems of at least one or more freight cars. The electronic vent valve can eliminate the need for the air brake system of each freight car to be manually activated (e.g., via bleed rod) before the freight cars can be switched. The benefits of the electronic vent valve can include, but are not limited to, increased employee safety, decreased freight car terminal dwell time, decreased freight car switching time, decreased destination travel time, and/or increase railroad efficiency and/or network velocity.

EXAMPLE EMBODIMENTS

Referring now to the figures, for the purposes of example and explanation of the fundamental processes and components of the disclosed systems, reference is made to FIG. 1, which illustrates a portion of a control valve set 100 of an example braking system of a train car. As will be understood and appreciated, the control valve set 100 illustrated in FIG. 1 represents merely one approach or example implementation of the disclosed technology, and other aspects are used according to various embodiments or implementations of the disclosed technology.

The control valve set 100 can be or include one or more components of an air brake system that can control (or can at least partially assist in controlling) the braking functionalities of a train. For example, the control valve set 100 can function with other components in the air brake system to apply braking force to the wheels of a freight car. As explained herein, the disclosed technology includes an electronic vent valve 101. The electronic vent valve 101 can be attachable to a one or more ports of a control valve set to thereby form the control valve set 100, and FIG. 1 illustrates an example of the electronic vent valve 101 being attached as such. The electronic vent valve 101 can function as a measurement tool (e.g., with the inclusion of, or fluid attachment to, one or more measuring sensors, such as one or more pressure sensors), a venting system for depressurizing one or more aspects of the control valve set 100, and/or as testing equipment (e.g., for federally mandated inspections). These and other features associated with the electronic vent valve 101 are discussed in further detail herein.

The control valve set 100 can be integrated into the air brake system a train and/or of a particular train car. Each freight car on the train can include a dedicated control valve set 100 to manage the braking functionalities of the corresponding freight car. That is to say, each car can include a corresponding electronic vent valve 101. The electronic vent valve 101 can be configured to detachably attach to the control valve set 100. For example, the electronic vent valve 101 can attach to the control valve set 100 via any attachment device such as a fastener (e.g., a threaded bolt or screw). Alternatively or in addition, the housing of the electronic vent valve 101 can be configured to mirror, mate with, and/or attach to one or more corresponding components of the control valve set 100 and/or nearby components of the freight car (e.g., the braking system). For example, the housing of the electronic vent valve 101 and/or one or more components of the freight car can include coupling features such as a snap, a clamp, a portion of a hinge, an aperture, a recessed portion, a notch, a protrusion, a slot, a spring clip, a tab, a latch, a detent, a compression fitting, mating threads, or any combination thereof, as non-limiting examples.

The control valve set 100 can include a triple valve and can be in fluid communication with a service reservoir, an emergency reservoir, and/or a brake cylinder, amongst other components of the brake system. The control valve set 100 can fluidly connect to an air compressor via a train line brake pipe (commonly referred to as a train line and/or brake pipe) and/or at least one control valve of the control valve set 100. The brake pipe can fluidly connect the air compressor to each control valve set 100 of each freight car. The air brake system can supply pressurized air generated by the air compressor into the control valve sets 100 via the brake pipe.

The pressurized air flowing into the control valve set 100 from the brake pipe can transition the triple valve into a charging configuration. While the triple valve is in the charging configuration, the air compressor supplies pressurized air into the emergency reservoir and/or the service reservoir. Once the service reservoir and the emergency reservoir are supplied with pressurized air, the air brake system is ready to apply braking force.

The air braking system can apply braking force by reducing the pressurized air in the brake pipe to a pressure that is lower than that of the service reservoir and/or the emergency reservoir. In a scenario where the brake pipe has a lower pressure than the service reservoir and/or the emergency reservoir, the pressurized air in the service reservoir can transition the triple valve to a braking configuration to thereby expose the brake cylinder (e.g., permit air to flow to the brake cylinder). Once exposed, the brake cylinder can fill with pressurized air and cause a brake shoe to apply pressure onto the wheels. By applying pressure onto the wheels of the freight car, the air brake system can slow the train.

The brake shoe can continue to apply force onto the wheels of the freight car as long as the pressurized air in the brake pipe exceeds the pressure in the service reservoir and the emergency reservoir. As the air pressure in the brake pipe increases to a pressure greater than the pressure in the service reservoir and/or the emergency reservoir, the brake shoe can be removed from contact with the wheels. The service reservoir and/or the emergency reservoir can continue to store pressurized air for later use should the air brake be reactivated (e.g., put in the braking configuration).

In the case where the train car no longer requires use of the air brake system (e.g., temporarily, such as when the train car is being moved in a rail yard), traditional control valve sets require a person (e.g., a railway employee) to manually vent the traditional control valve set for each individual freight car. For example, an employee in a rail yard may be required to walk to each freight car and manually apply a release rod that vents to atmosphere the emergency reservoir, the service reservoir, and the brake cylinder. Venting to atmosphere can be defined as the process of equalizing the internal pressure of the air braking system, or a component of the air braking system, with the atmospheric pressure. As discussed herein, venting the air brake system to atmosphere disengages the brakes and allows free rolling of the freight car. The process of manually venting the traditional control valve set can be time consuming, costly, tedious, and potentially harmful to employees performing the task (e.g., due to repetitive motions or other dangers).

The control valve set 100 can automate the task of manually venting the emergency reservoir, the service reservoir, and the brake cylinder. The electronic vent valve 101 can be installed onto one or more ports (e.g., a four-port section) of an existing brake system. That is to say, the electronic vent valve 101 can be retrofitted on train cars currently in service, as described herein and without modification (other than attachment of the electronic vent valve 101 to the train cars). Alternatively or in addition, the electronic vent valve 101 can be installed or integrated into newly manufactured train cars.

Figure 2:
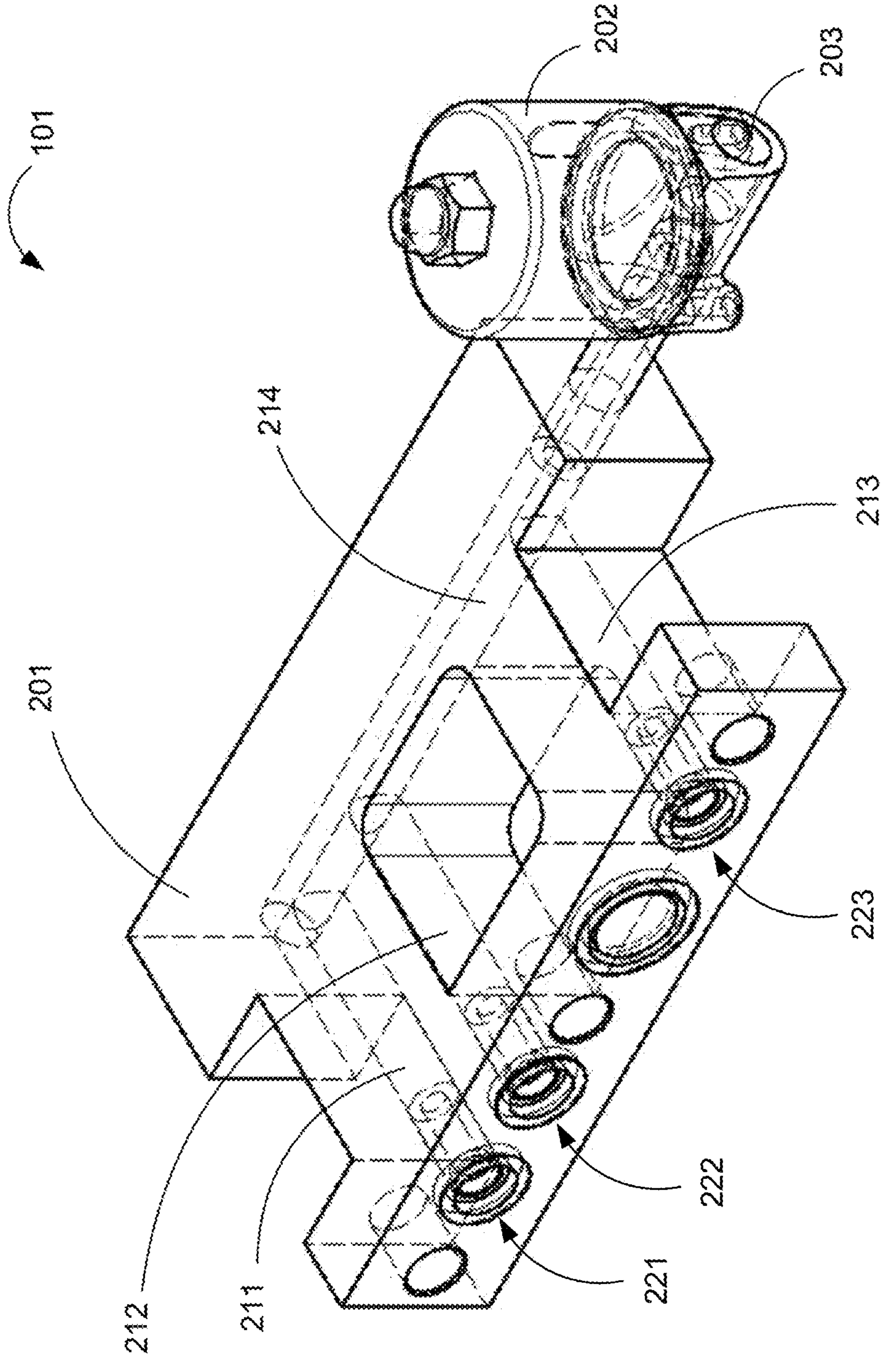
FIG. 2 illustrates a perspective view of an example electronic vent valve with invisible walls for clarity of illustration, in accordance with the present disclosure.

Referring now to FIG. 2, the example electronic vent valve 101 can employ or include a manifold structure 201 and a solenoid valve 202 to depressurize the emergency reservoir, the service reservoir, the brake cylinder, and the brake pipe. The electronic vent valve 101 can connect directly to ports that are in fluid communication with the emergency reservoir, the service reservoir, the brake cylinder, and/or the brake pipe, and the electronic vent valve 101 can provide a path for pressurized air to flow to the atmosphere when the solenoid valve is activated (e.g., opened). The electronic vent valve 101 can include at least one solenoid valve 202 to depressurize the components of the air braking system. The solenoid valve 202 can depressurize one or more components of the air braking system by permitting air to flow out of the air braking system and the electronic vent valve 101 via an outlet 203 of the solenoid valve 202.

The housing of the electronic vent valve 101 can be formed from and/or can include a metal, metal composite, polymer, natural material, any other substance that can withstand the air pressure produced by the air brake system, and/or any combination thereof. The manifold structure 201 can include an air outlet path (e.g., a solenoid air gallery 214) in fluid communication with one or more air paths that are configured to receive air released from one or more corresponding ports of the freight car brake system (e.g., a service reservoir air gallery 211, an emergency reservoir air gallery 212, a brake cylinder air gallery 213). Thus, the electronic vent valve 101 can provide (or include) a manifold design that can help facilitate easy venting of pressurized air from the control valve set 100. Moreover, the electronic vent valve 101 can be configured to permit the brake system to operate normally when the solenoid valve 202 is not engaged (e.g., closed).

The service reservoir air gallery 211 can be configured to fluidly connect to a service reservoir outlet port of the brake system. The service reservoir air gallery 211 can include an inlet (e.g., inlet 221) that can mechanically and fluidly connect to the service reservoir outlet port (or another outlet of the control valve set 100).

The emergency reservoir air gallery 212 can be configured to fluidly connect to an emergency reservoir outlet port of the brake system. The emergency reservoir air gallery 212 can include an inlet (e.g., inlet 222) that can mechanically and fluidly connect to the emergency reservoir outlet (or another outlet of the control valve set 100).

The brake cylinder air gallery 213 can be configured to fluidly connect to a brake cylinder outlet port of the brake system. The brake cylinder air gallery 213 can include an inlet (e.g., inlet 223) that can mechanically and fluidly connect to the brake cylinder outlet port (or another outlet of the control valve set 100).

The service reservoir air gallery 211, the emergency reservoir air gallery 212, and the brake cylinder air gallery 213 can each fluidly connect with the solenoid air gallery 214 (e.g., at an end opposite from their corresponding inlets). The solenoid air gallery 214 can fluidly connect with the solenoid valve 202 of the electronic vent valve 101.

The solenoid valve 202 can function as an automated valve for releasing pressurized air from the control valve set 100 into the atmosphere. For example, the control system of the electronic vent valve 101 can activate the solenoid valve 202 to vent air from the control valve set 100. In another example, the control system can deactivate the solenoid valve 202 to restrict or prevent air flow out of the control valve set 100. In an activated position, the solenoid valve 202 can be open and can release pressurized air into the atmosphere. In a deactivated position, the solenoid valve 202 can close and can stop the release of pressurized air into the atmosphere. The solenoid valve 202 can be operated by the electronic vent valve 101 (or a control device in communication with the electronic vent valve 101 and/or the solenoid valve 202) and can include any type or model of solenoid valve that can withstand the pressure produced by the air brake system. While the examples and embodiments described herein expressly reference a solenoid valve, other types of valves are contemplated. For example, the electronic vent valve 101 can include any valve that can be configured to restrict or release pressurized airflow and can be remotely operated (e.g., electronically operated whether by wired or wireless communication).

Figure 3:
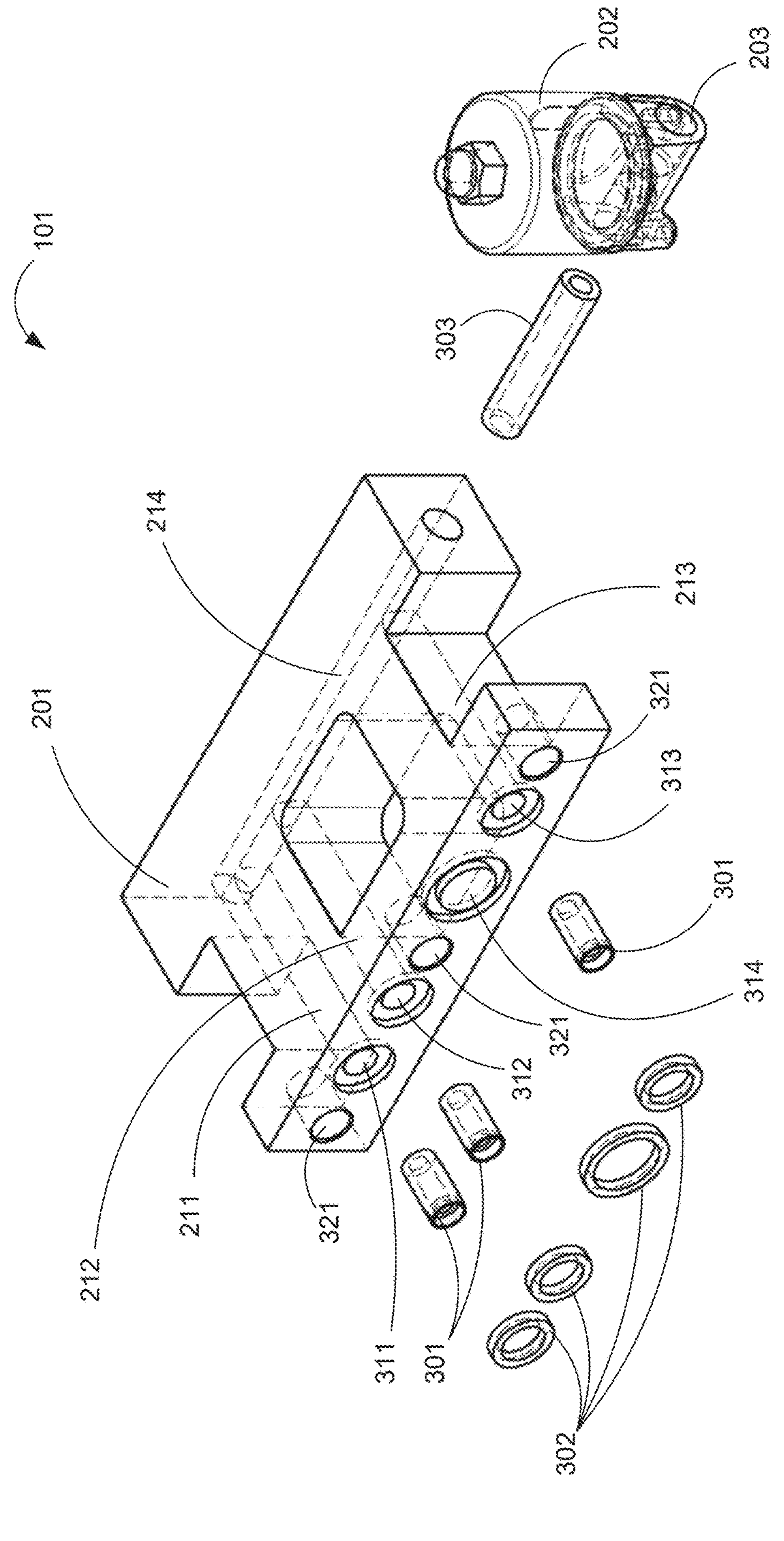
FIG. 3 illustrates an exploded perspective view of an example electronic vent valve with invisible walls for clarity of illustration, in accordance with the present disclosure.
Figure 5:
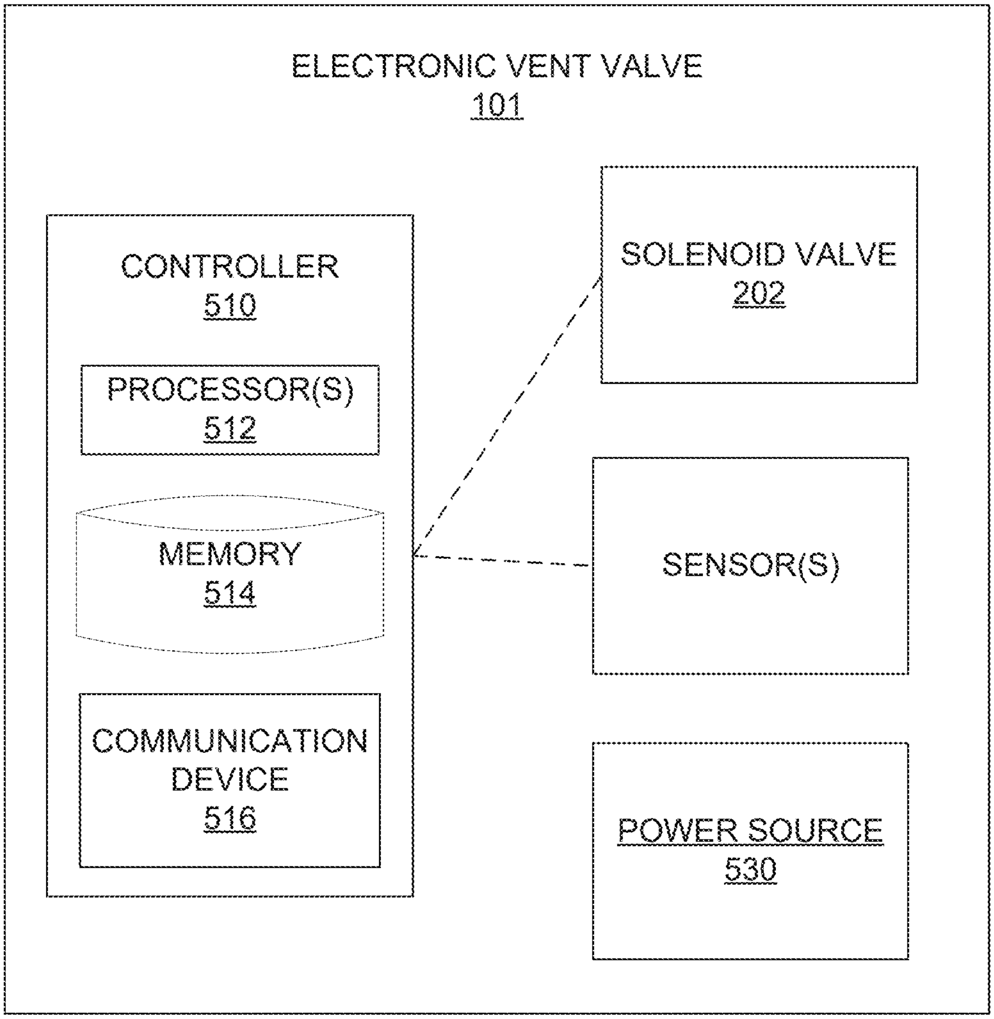
FIG. 5 illustrates a schematic diagram of an example electronic vent valve, in accordance with the present disclosure.

Referring now to FIG. 3, illustrated is an exploded perspective view of the example electronic vent valve 101. The electronic vent valve 101 can include one or more check valves 301, one or more O-rings 302, and/or a solenoid connection 303. The check valves 301 can be inserted into the corresponding inlet of the service reservoir air gallery 211, the emergency reservoir air gallery 212, and/or the brake cylinder air gallery 213. The check valves 301 can restrict the flow of air in a particular direction. For example, when the solenoid valve 202 is activated, the check valves 301 can allow pressurized air to flow from the control valve set 100 to atmosphere (e.g., via the solenoid air gallery 214 and the outlet 203 of the solenoid valve 202). Further, the check valves 301 can prevent air from flowing from the electronic vent valve 101 (e.g., from a location within the electronic vent valve 101 downstream from the check valves 301) back to the control valve set 100. The electronic vent valve 101 can include one or more sensors (e.g., as shown in FIG. 5) that can monitor specific conditions associated with the control valve set 100. As non-limiting examples, the one or more sensors (whether located internally or otherwise) can include one or more air pressure sensors (e.g., an air pressure transducer, a piezoelectric pressure sensor, an air pressure gauge), one or more flow rate sensors, one or more temperature sensors, one or more humidity sensors, one or more accelerometers, one or more geolocation sensors, and/or any other sensor(s). Such sensors may be installed at, in, or near the check valves 301, as non-limiting examples. The electronic vent valve 101 can include at least one check valve 301 (e.g., depending on the configuration of the control valve set 100).

The electronic vent valve 101 can include one or more O-rings 302 and/or any other type of sealant or sealing device to create an airtight connection between the electronic vent valve 101 (e.g., the inlets of the service reservoir air gallery 211, emergency reservoir air gallery 212, and/or brake cylinder air gallery 213) and the control valve set 100. The O-rings 302 can be located in a service aperture 311, an emergency aperture 312, a brake cylinder aperture 313, and a brake pipe aperture 314, which can position the O-rings 302 to interface with both the electronic vent valve 101 and the control valve set 100. The brake pipe aperture 314 can be fluidly isolated from the air galleries 211-214. As will be appreciate by those having skill in the art, the brake pipe port can be used (e.g., in conjunction with the service reservoir port, the emergency reservoir port, and the brake cylinder port) for testing of the air brake system. The brake pipe aperture 314 can be (or be connected to) a dead end within the electronic vent valve 101. As such, the brake pipe aperture 314 can act as a cap or cover for the brake pipe port when the electronic vent valve 101 is attached to the control valve set 100.

The solenoid connection 303 can connect the solenoid valve 202 to the manifold structure 201. The solenoid connection 303 can include, but is not limited to, a National Pipe Tapered (NPT) connection, a British Standard Pipe Taper (BSPT) connection, a British Standard Parallel Pipe (BSPP) connection, or any connection that facilitates removal of the solenoid valve 202 from the manifold structure 201. That is to say, the solenoid valve 202 can be detachably attachable to the manifold structure 201. As such, the solenoid valve 202 can be easily replaced (e.g., in the event of a damaged or malfunctioning solenoid valve 202) by detaching the solenoid valve 202 from the solenoid connection 303 (e.g., by a set screw, a compression fitting, or any other mechanical attachment device).

Figure 4:
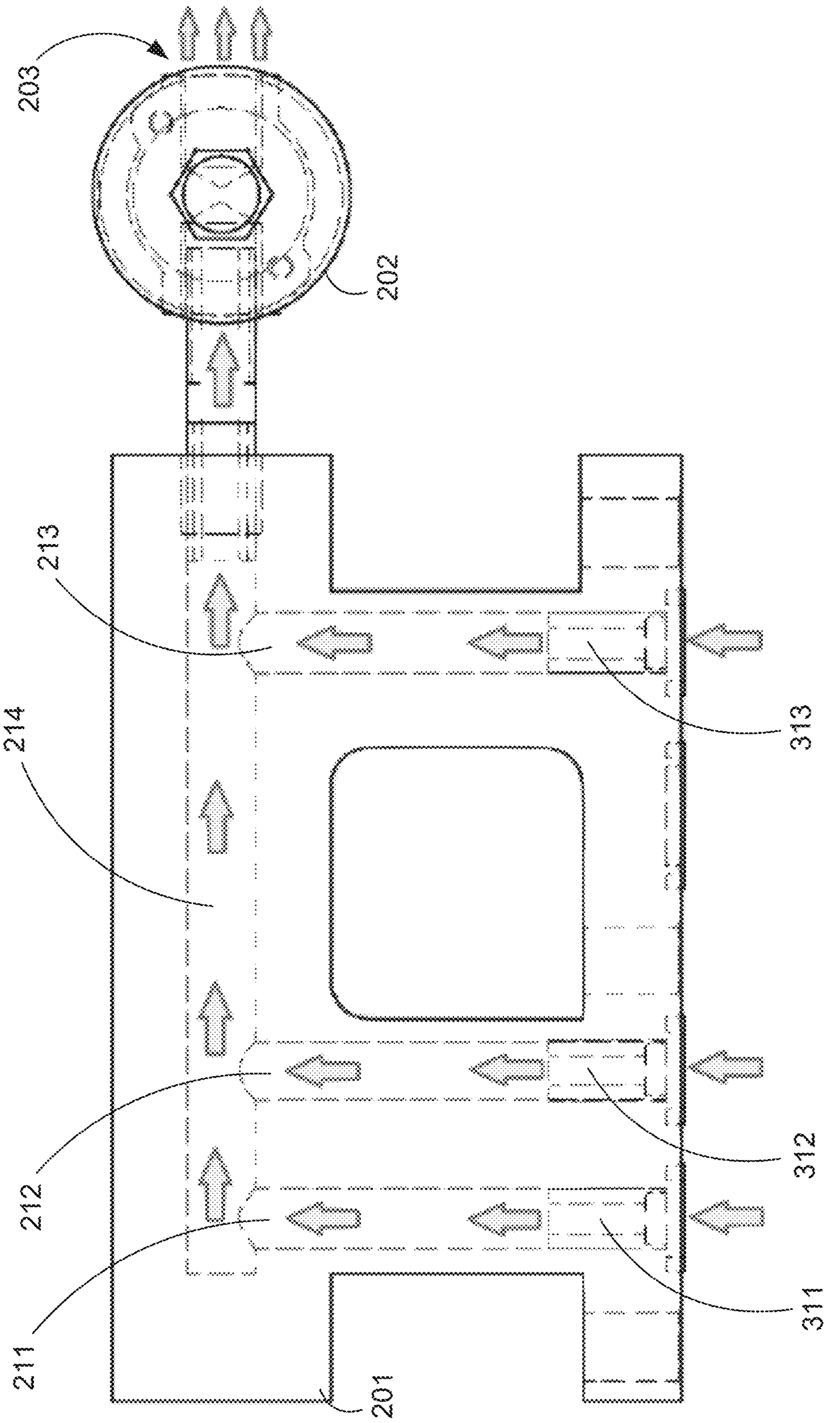
FIG. 4 illustrates a top view of an example electronic vent valve with invisible walls for clarity of illustration, in accordance with the present disclosure.

The manifold structure 201 can includes bolt apertures 321. As illustrated, one or more of the bolt apertures 321 can extend through a flange that is proximate the inlets of the service reservoir air gallery 211, emergency reservoir air gallery 212, and/or brake cylinder air gallery 213, which can ensure a tight connection (e.g., airtight) between the inlets of the service reservoir air gallery 211, emergency reservoir air gallery 212, and/or brake cylinder air gallery 213 and the corresponding ports or other outlets of the control valve set 100. Other configurations are herein contemplated. For example, alternatively or in addition, one or more of the bolt apertures 321 can extend through the entire depth (e.g., in the top-bottom direction as shown in FIG. 4) of the manifold structure 201. Regardless, the bolt apertures 321 can extend through at least a portion of the manifold structure 201 and can accept bolts, screws, rivets, and/or any other securing device. The bolts screws, and/or rivets can extend through the bolt apertures 321 and can attach the electronic vent valve 101 onto the control valve set 100.

Referring now to FIG. 4, illustrated is a top view of the example electronic vent valve 101. As discussed herein, the solenoid valve 202 of the electronic vent valve 101 can be activated to allow the free flow of pressurized air from the control valve set 100 to atmosphere. Pressurized air can flow from the service reservoir into the service reservoir air gallery 211, from the emergency reservoir into the emergency reservoir air gallery 212, and/or from the brake cylinder into the brake cylinder air gallery 213. The pressurized air can then flow from service reservoir air gallery 211, emergency reservoir air gallery 212, and/or brake cylinder air gallery 213 into the solenoid air gallery 214. Once the pressurized air is in the solenoid air gallery 214, the pressurized air can exit the electronic vent valve 101 through the outlet 203 of the solenoid valve 202 when the solenoid valve 202 is in the open configuration. The flow of pressurized air through the electronic vent valve 101 and out of the solenoid valve 202 is generally illustrated by arrows in FIG. 4. The check valves 301 can be located in corresponding air galleries 211-213 and can restrict or prevent the flow of pressurized air back into the control valve set 100.

Referring now to FIG. 5, the electronic vent valve 101 can include a controller 510 and/or a power source 530. One, some, or all of the various components of the controller 510 and/or the power source 530 can be attached to or disposed within the body of the electronic vent valve 101 (e.g., attached to or located at least partially within a portion of the manifold structure 201). Alternatively, one, some, or all of the various components of the controller 510, the communication device 516, and/or the power source 530 can be located remotely from the body of the electronic vent valve (e.g., the manifold structure 201) and can be in electrical communication with one or more components of the electronic vent valve 101 (e.g., the solenoid valve 202, the one or more sensors) to conduct operations therewith.

The controller 510 of the electronic vent valve 101 can include one or more processors 512, memory 514, and/or a communication device 516. The memory 514 can store instructions that, when executed by any of the one or more processors 512, can cause the controller 510 to perform one or more actions, such as sending operational instructions to one or more components (e.g., instructions for the solenoid valve 202 to open or close, instructions for one or more sensors to collect data, instructions for the communication device 516 to transmit or receive data). The control system can be dedicated to controlling operation of the electronic vent valve 101. For example, the control system can be in communication with a freight car control system (e.g., configured to control certain operations of a particular train car) or an overall train conductor system (e.g., configured to control operations of various systems and subsystems of the entire train). Alternatively, the control system can be the freight car control system or the overall train conductor system. For example, the overall train conductor system can itself be configured to control operation of the electronic vent valve 101, among other things.

The controller 510 can include any particular computing infrastructure. For example, the controller 510 can employ or include at least one programmable logic controller (PLC). The PLC can be a computer processing unit that can be used for automaton control, data collection, and/or for managing digital and/or analog input and outputs (I/O). PLCs can allow for future expansion when adding different types of Inputs, Outputs, and control cards. The automaton control can include an array of PLCs, microcontroller systems, mobile computing devices, local computing devices, and/or any local or remote computing system. For example, the locomotive can include a local computing infrastructure acting as the controller 510 of the electronic vent valve 101 while wirelessly communicating with a centralized computing source at an offsite location. Alternatively or in addition, each individual electronic vent valve 101 can include its own dedicated controller 510 for operating the electronic vent valve 101 on each individual freight car. For example, the local computing infrastructure of the train can be located at the locomotive, and the local computing infrastructure can communicate with the controller 510 of each electronic vent valve 101 on each freight car to send commands associated with each corresponding control valve set 100. Stated otherwise, the controller 510 can be configured to communicate with (e.g., transfer data between or instructions to) the solenoid valve 202 and/or the one or more sensors 202 of the The controller 510, the local computing infrastructure, and/or any computing system powering the electronic vent valve 101 (or more than one electronic vent valves 101) can communicate using wired or wireless communication. For example, wireless communication protocols and techniques may include but are not limited to Transmission Control Protocol/Internet Protocol (TCP/IP), Bluetooth, Zigbee, MQTT, Modbus (e.g., TCP/IP, User Datagram Protocol (UDP)), Data Distribution Service (DDS), and cellular. Alternatively or in addition, a wired car to car connection can utilize communication protocols such as Transmission Control Protocol/Internet Protocol (TCP/IP), Modbus (e.g., TCP/IP, UDP, remote terminal unit (RTU)), Fieldbus, Profibus, Serial Communications (RS232, RS485), universal asynchronous receiver/transmitter (UART), I2C, CANBUS, Universal Serial Bus (USB), and/or any other particular wired communication protocol. Stated otherwise, the communication device 516 of the electronic vent valve 101 can be configured to transmit and/or receive messages (e.g., with a local computing device, with remote computing device) via any desirable communication protocol, and such messages can include, as non-limiting examples, data collected by the one or more sensors that is transmitted from the electronic vent valve 101 to the local or remote computing device or instructions from the local or remote computing device for the electronic vent valve 101 to perform some action, such as opening or closing the solenoid valve 202, a request from the local or remote computing device to provide a current status of the solenoid valve 202 (e.g., open or closed), transmission of the current status of the solenoid valve 202, or initiating or ending the collection of data by one or more sensors.

The electronic vent valve 101 can include a power source 530 or be connected to an external power source 530. For example, the electronic vent valve 101 can include a battery (e.g., 12-volt battery system) and/or any other power source to power the solenoid valve 202, the sensor(s), the controller 510, and/or the communication device 516. The activated solenoid valve 202 can vent the air brake system to atmosphere. The power source 530 can include, but is not limited to, rechargeable batteries, a centralized power source, remote power source, solar power sources, any other useful power source, or any combination thereof. If included, the rechargeable batteries can be incorporated into the power source 530 along with one or more additional power sources, or as a standalone power source 530 to power the electronic vent valve 101 or any component thereof. The rechargeable batteries can be automatically or manually rechargeable at certain intervals (e.g., a predetermined intervals, upon the occurrence of predetermined triggers). The rechargeable batteries can be stored at a single location on a locomotive as a power bank and/or can include remote power options distributed amongst each freight car. The train can include an alternator (e.g., an axle-mounted alternator) or similar device to recharge the rechargeable batteries. For example, as the train is in motion, the spin of the axles can power the axle-mounted alternator, and the alternator can recharge the rechargeable batteries. Solar panels can be attached to the freight car to charge the rechargeable batteries and/or to power the electronic vent valve 101 (or any component thereof) directly. An air turbine generator can be connected in line with the brake pipe on each freight car to recharge the rechargeable batteries. An electromechanical suspension-based energy harvesting system can attach to the freight car for turning vertical suspension movement into power to charge the rechargeable batteries. The power source can include (or be electrically connected to) a hardwired car-to-car connection infrastructure extending throughout the train. For example, the hardwired car-to-car connection can include individual connections daisy chained between each freight car.

Figure 6:
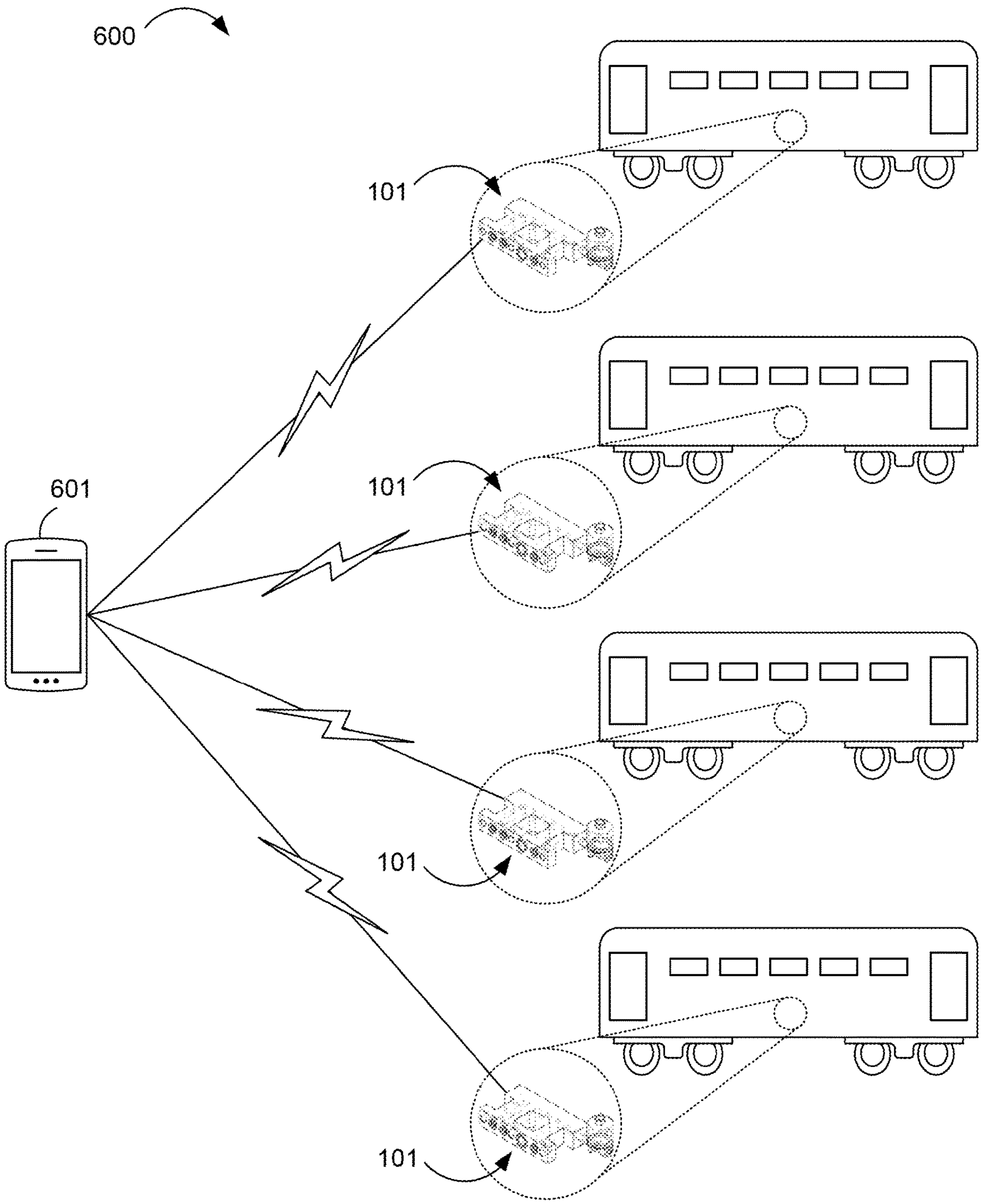
FIG. 6 illustrates an example operation environment including multiple electronic vent valves, in accordance with the present disclosure.

Alternatively or in addition to the various components and capabilities described herein, an electronic vent valve system (e.g., an electronic vent valve 101 and/or the corresponding controller 510) for a given freight car can be configured to communicate with one or more electronic vent valve systems installed on corresponding freight cars, such as the operating environment 600 illustrated in FIG. 6. Each electronic vent valve system can include a geolocation sensor and/or accelerometer (e.g., as one of the one or more sensors described herein). Based on a comparison of the geolocation data, for example, it can be determined (e.g., via the controller 510; via an external computing device 601 which can include a local computing device or system and/or a remote computing device or system; or via any combination thereof) which electronic vent valves 101 are located on freight cars forming a particular train (e.g., via physical proximity and/or being positioned on a shared track). Alternatively or in combination, a comparison of accelerometer data (e.g., current accelerometer data, stored accelerometer data corresponding to one or more previous points in time) can be used to identify which electronic vent valve systems are located on freight cars forming a particular train.

That is to say, the geographic locations and/or current or previous accelerometer data can be analyzed to determine whether a plurality of train cars are interconnected to form a single train. For example, it can be determined from the location data for the plurality of electronic vent valves 101 (or for the plurality of train cars) that each individual train car of the plurality of train cars is likely to be connected together. Alternatively or in addition, it can be determined from the accelerometer data that each of the plurality of train cars is moving at approximately the same speed and in approximately the same direction (or traveling along approximately the same travel path). Such determinations can be made if the data for the various train cars are within a predetermined level of similarity of one another. For example, the geographic location or accelerometer data (e.g., speed, heading) of a first train car (or a corresponding first electronic vent valve 101) can be compared to the same type of data for a second train car (or a corresponding second electronic vent valve 101). If the second train car is located within a predetermined proximity of the first train car (e.g., a distance approximately equal to half a train car length, a distance approximately equal to a train car length) and/or if the second train car is travelling within a predetermined speed variance of the first train car (e.g., at the same speed; at approximately the same speed; within a predetermined percentage of the speed of the first train car, such as within 0.5%, 1%, 2%, or the like; within a predetermined range of the speed of the first train car, such as the second train car travelling at the speed of the first train car±0.5 mile per hour (MPH), the speed of the first train car±1 MPH, the speed of the first train car±2 MPH, the speed of the first train car±3 MPH, or the like) and/or if the second train has a heading that is within a predetermined percentage or value range of the heading of the first train car, it can be determined that the first and second train car are connected together and are travelling in a common train. (Alternatively or in addition, these analysis steps can be performed on previous data (e.g., data from 30 minutes in the past, 60 minutes in the past, 90 minutes in the past, etc.), which can be helpful in certain situations, such as if the train cars are currently stopped in a train yard. This process can be repeated for each of the plurality of train cars (or for the plurality of electronic vent valves 101).

Once it is determined which electronic vent valves 101 are located on a particular train, the external computing device 601 (e.g., the local and/or remote computing device) can be enabled to transmit a mass signal to each of electronic vent valves associated with that particular train (e.g., to activate the solenoid valve 202 of each of the electronic vent valves 101 located on that particular train.

The electronic vent valve 101 can significantly reduce the time required to depressurize the air brake system of a train by automatically venting one, some, or all of the components of the brake system (e.g., the emergency reservoir, the service reservoir, the brake cylinder, the brake pipe) at the same time. By automating the venting process for the air brake system, train yard employees may no longer need to spend time in potentially hazardous areas of the rail yard. The electronic vent valve 101 can increase railroad efficiency and/or network velocity and/or can decrease the switching time of freight cars in the rail yard. Alternatively or in addition, the electronic vent valve 101 can reduce the destination travel time and terminal dwell time.

As mentioned herein, the one or more sensors of the electronic vent valve 101 can include one or more pressure transducers or a similar sensor to monitor the brake pipe, emergency reservoir, service reservoir, and/or brake cylinder of the air brake system. For example, the control system can receive data from the pressure transducers and determine average pressure over the course of a train route. Continuing this example, the control system can send a notification to a train engineer console or interface if the average pressure is inconsistent with historical recorded average pressures (e.g., if the average pressure deviates from the historical recorded average pressure(s) by a certain or predetermined amount). The controller 510 can be configured to monitor the data produced by the pressure transducers to diagnose system health (e.g., identify a first issue if the difference between the average pressure and the historical recorded average pressure is greater than a first predetermined threshold, identify a second issue if a measured pressure spike or maximum value is greater than a second predetermined threshold, identify a third issue if a measured pressure dip or minimum value is less than a third predetermined threshold) and can output one or more corresponding alerts if performance of the air brake system is abnormal or if one or more specific issues have been identified. Alternatively or in addition, the controller 510 can be configured to output instructions for transmitting such data to any local and/or remote computing device (e.g., the external computing device 601), and the local and/or remote computing device can make such determinations.

The control system can monitor and diagnose brake system issues. For example, the electronic vent valve 101 can include various sensors to determine leakages within the air brake system. Alternatively or in addition, single freight car air tests are a federally mandated air brake test performed on the air brake system every five years, and continuing this example, the electronic vent valve 101 (e.g., the controller 510 and the one or more sensors) can perform (e.g., automatically perform, perform in response to receiving a mass message from the external computing device 601) the single freight car air tests before inspections to ensure proper functionality of the air brake system. The electronic vent valve 101 can thus reduce the time and need for manually installing an automated single car air test device used to perform the test. The electronic vent valve 101 can include all functionalities of the automated single car air test device and can perform the federally required tests without the need for external testing devices or in-person inspections. Alternatively or in addition, the controller 510 of the electronic vent valve 101 can be configured to record and distribute data associated with the federally required tests for storage, processing, and other potential uses.

As will be appreciated by those having skill in the art, trains can occasionally encounter sticking brakes, which defines a situation where the air brake system remains engaged when commanded to release. If the problem causing the sticking brakes cannot be identified or corrected, the air brake system is typically cut out. Cutting out or disabling the air brake system can require train yard employees to manually vent the air brake system to prevents the brake pipe from charging the air brake system. Depending on train length and terrain, the inspection process can cause lengthy delays. The control system of the electronic vent valve 101 can include a remote cut out feature for venting the air brake system during a sticking brake scenario and/or any scenario requiring venting of the air brake system. Employing the electronic vent valve 101 to automatically vent the air brake system without manual procedures can reduce inspection times, train delays, and/or train yard employees' exposure to potentially hazardous conditions.

During a train emergency, the train engineer or a system failure can cause the brake pipe pressure to vent to atmosphere. When the brake pipe pressure vents to atmosphere in an emergency, air must propagate sequentially throughout the train line from the initial vent location to the end of the air brake system. The train line pressure venting to atmosphere may delay the application of air brake systems. Delaying the application of the air brake systems can increase the stopping time of the train, which can be dangerous in certain situations as it is more difficult for the trains to slow down or stop. Delaying the application of the air brake systems of each freight car increases longitudinal forces between freight cars as parts of the train rapidly decrease in speed while other freight cars are delayed in their braking response. The electronic vent valve 101 can help identify an emergency brake application and can automatically and instantaneously (or nearly instantaneously) signal the electronic vent valves 101 to vent the control valve set 100 of each freight car simultaneously (or substantially simultaneously). Accordingly, the electronic vent valve 101 can, in at least some circumstances, improve the safe operability of trains, thereby improving the overall safety of the train and the train network at large.

The freight cars can be required to include a retaining valve that controls the release of a brake piston when pressurized air from the brake pipe is charging the air brake system. The retaining valve can allow trains to maintain a constant braking force (typically on mountainous grades), while also allowing the air brake system to remain charged and apply full braking force when needed. The retaining valve must be manually set on each freight car before departure and manually reset to normal operation when unneeded. The electronic vent valve 101 can control the brake piston pressure on each individual freight car, removing the need for manual operation of the retaining valve. By removing the need of manual operation of the retaining valve, the electronic vent valve 101 can help reduce train dwell and/or train yard employees' exposure to potentially hazardous conditions.

Trains can include an end of train device (EOTD) used to monitor and ensure continuity of the brake pipe pressure at the end of the train. The EOTD can also help to accelerate brake pipe pressurized air propagation by releasing air during an emergency brake application. The electronic vent valve 101 can control the release of air from the brake pipe, helping to accelerate the emergency brake application. The electronic vent valve 101 and the associated control system can constantly monitor the brake pipe pressure throughout the train and eliminate the need of the EOTD.

The foregoing description of the exemplary embodiments has been presented only for the purposes of illustration and description and is not intended to be exhaustive or to limit the inventions to the precise forms disclosed. Many modifications and variations are possible in light of the above teaching.

While a particular technology may be discussed herein with respect to a particular device, system, or method, the technology is not so limited and can be embodied in any other such form. For example, the disclosed technology includes any and all methods or processes described herein as being performed in whole or in part by any particular device or system. Similarly, the disclosed technology includes any systems or devices configured to perform any methods or processes described herein.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. An electronic vent valve comprising:

a plurality of air galleries, each air gallery being in fluid communication with a corresponding inlet of a plurality of inlets, each of the plurality of inlets being configured to fluidly connect to a fluid path of a railcar;

an exit air gallery in fluid communication with each of the plurality of air galleries; and a solenoid valve in fluid communication with the exit air gallery, the solenoid valve being configured to transition between an open position and a closed position, wherein upon attachment of the electronic vent valve to a train car, the open position releases air from an air brake system of the train car to thereby enable the train car to roll freely with unapplied brakes.

2. The electronic vent valve of claim 1, wherein the electronic vent valve is attachable to a control valve set of the train car.

3. The electronic vent valve of claim 2, wherein:

the control valve set comprises:

a service reservoir outlet in fluid communication with a service reservoir of the train car;

an emergency reservoir outlet in fluid communication with an emergency reservoir of the train car; and a brake cylinder outlet in fluid communication with a brake cylinder of the train car;

a first inlet of the plurality of inlets is configured to fluidly and mechanically connect to the service reservoir outlet;

a second inlet of the plurality of inlets is configured to fluidly and mechanically connect to the emergency reservoir outlet; and a third inlet of the plurality of inlets is configured to fluidly and mechanically connect to the brake cylinder outlet.

4. The electronic vent valve of claim 2, further comprising one or more bolt apertures, each of the one or more bolt apertures being configured to align with one or more corresponding bolt apertures on the train car such that the electronic vent valve is attachable to the train car via one or more corresponding bolts.

5. The electronic vent valve of claim 1, further comprising a plurality of check valves, each check valve of the plurality of check valves being located in a corresponding air gallery of the plurality of air galleries.

6. The electronic vent valve of claim 1, further comprising a solenoid connection in fluid communication with the exit air gallery, the solenoid valve being detachably attachable to the solenoid connection.

7. The electronic vent valve of claim 1, further comprising a controller having one or more processors and memory, wherein the controller is configured to output instructions for the solenoid valve to open or close.

8. The electronic vent valve of claim 7, wherein the controller is in electric communication with a computing device and the controller is configured to output the instructions for the solenoid valve to open or close in response to receiving an instruction signal from the computing device.

9. The electronic vent valve of claim 7, further comprising one or more sensors in electric communication with the controller, wherein the controller is in electric communication with a computing device and the controller is configured to transmit sensor data to the computing device, the sensor data being indicative of data collected by the one or more sensors.

10. The electronic vent valve of claim 9, wherein the one or more sensors comprise a pressure sensor, a geolocation sensor, or an accelerometer.

11. A system comprising:

a plurality of train cars, each of the plurality of train cars comprising an electronic vent valve and each of the electronic vent valves comprising:

a plurality of air galleries, each air gallery being in fluid communication with a corresponding inlet of a plurality of inlets, each of the plurality of inlets being fluidly connected to a fluid path of a corresponding railcar;

an exit air gallery in fluid communication with each of the plurality of air galleries; and a solenoid valve in fluid communication with the exit air gallery, the solenoid valve being configured to transition between an open position and a closed position, wherein upon attachment of the electronic vent valve to a corresponding train car of the plurality of train cars, the open position releases air from an air brake system of the corresponding train car to thereby enable the corresponding train car to roll freely with unapplied brakes.

12. The system of claim 11, wherein each electronic vent valve is attached to a control valve set of the corresponding train car of the plurality of train cars, each control valve set comprising:

a service reservoir outlet in fluid communication with a service reservoir of the corresponding train car of the plurality of train cars;

an emergency reservoir outlet in fluid communication with an emergency reservoir of the corresponding train car of the plurality of train cars; and a brake cylinder outlet in fluid communication with a brake cylinder of the corresponding train car of the plurality of train cars, wherein, for each electronic vent valve:

a first inlet of the plurality of inlets is configured to fluidly and mechanically connect to the service reservoir outlet of a corresponding control valve set;

a second inlet of the plurality of inlets is configured to fluidly and mechanically connect to the emergency reservoir outlet of the corresponding control valve set; and a third inlet of the plurality of inlets is configured to fluidly and mechanically connect to the brake cylinder outlet of the corresponding control valve set.

13. The system of claim 11, wherein each electronic vent valve further comprises a plurality of check valves, each check valve of the plurality of check valves being located in a corresponding air gallery of the plurality of air galleries.

14. The system of claim 11, wherein each electronic vent valve further comprises a solenoid connection in fluid communication with the exit air gallery, the solenoid valve being detachably attachable to the solenoid connection.

15. The system of claim 11, wherein each electronic vent valve further comprises a controller having one or more processors and memory, wherein the controller is configured to output instructions for the corresponding solenoid valve to open or close.

16. The system of claim 15, wherein the controller of each electronic vent valve is in electric communication with a common computing device and the controller of each electronic vent valve is configured to output the instructions for the corresponding solenoid valve to open or close in response to receiving an instruction signal from the computing device.

17. The system of claim 15, wherein each electronic vent valve further comprises one or more sensors in electric communication with the controller, wherein the controller of each electronic vent valve is in electric communication with a common computing device and the controller of each electronic vent valve is configured to transmit sensor data to the computing device, the sensor data being indicative of data collected by the corresponding one or more sensors.

18. The system of claim 17, wherein, for each electronic vent valve, the one or more sensors comprise a pressure sensor, a geolocation sensor, or an accelerometer.

19. The system of claim 15 further comprising the computing device, the computing device being configured to:

determine the plurality of train cars are connected together to form a train by at least:

receiving, from each electronic vent valve, geolocation data indicating a location of the corresponding train car of the plurality of train cars; and determining, for each electronic vent valve, that the location of the corresponding train car is within a predetermined range of a location of another train car of the plurality of train cars; and transmit a mass instruction signal for each of the electronic vent valves to transition the corresponding solenoid valve to the open position.

20. The system of claim 15 further comprising the computing device, the computing device being configured to:

determine the plurality of train cars are connected together to form a train by at least:

receiving, from each electronic vent valve, accelerometer data indicating a speed of the corresponding train car of the plurality of train cars; and determining, for each electronic vent valve, that the speed of the corresponding train car is within a predetermined range of a speed of another train car of the plurality of train cars; and transmit a mass instruction signal for each of the electronic vent valves to transition the corresponding solenoid valve to the open position.

* * * * *